United States Patent

[11] 3,609,755

[72] Inventor Alessandro Fenyves
Milan, Italy
[21] Appl. No. 823,676
[22] Filed May 12, 1969
[45] Patented Sept. 28, 1971
[73] Assignee GTE Automatic Electric Laboratories Incorporated
Northlake, Ill.
[32] Priority Sept. 24, 1968
[33] Italy
[31] 21592 A/68

[54] UNIPOLAR TO BIPOLAR CODE CONVERTER
2 Claims, 4 Drawing Figs.

[52] U.S. Cl. .......... 340/347 DD, 325/38 A, 328/56
[51] Int. Cl. .......... G06f 5/00, H04l 3/00, H03k 13/24
[50] Field of Search .......... 328/55, 56, 66, 67; 333/20, 29; 331/151; 178/70; 307/208, 209, 106, 108, 268, 293; 340/347 DD; 325/38, 38 A

[56] References Cited

UNITED STATES PATENTS

| | | | |
|---|---|---|---|
| 2,465,840 | 3/1949 | Blumlein .......... | 307/268 X |
| 2,996,578 | 8/1961 | Andrews, Jr. .......... | 178/70 |
| 3,096,445 | 7/1963 | Herzog .......... | 307/286 X |
| 3,418,604 | 12/1968 | Ross .......... | 328/56 |
| 3,441,751 | 4/1969 | Benedict .......... | 307/293 X |
| 2,820,909 | 1/1958 | Plouffe .......... | 328/56 X |

*Primary Examiner*—Maynard R. Wilbur
*Assistant Examiner*—Michael K. Wolensky
*Attorneys*—Cyril A. Krenzer, K. Mullerheim, B. E. Franz and Robert J. Black

ABSTRACT: A circuit arrangement adapted to effect conversion of unipolar code pulses into corresponding pulses having an alternating bipolar form (pseudoternary code pulses). By employing the reflection occurring in a line matched to the conversion circuit and short circuited at the distant terminal, the usual two separate channel double regeneration technique is avoided.

"PRIOR ART"

INVENTOR.
ALESSANDRO FENYVES
BY
AGENT

UNIPOLAR TO BIPOLAR CODE CONVERTER

BACKGROUND OF THE INVENTION

1. Field of the Invention

This invention relates to transmission of information by pulse techniques and more particularly to pulse generators for alternately generating pulses of opposite polarity in response to input pulses of the same polarity.

2. Description of the Prior Art

Unipolar to bipolar pulse converters are well known. Most prior art converters employ some technique to convert alternating pulses into pulses of opposite polarity or sign. Following this, regeneration of the alternating bipolar pulses occurs usually by separately regenerating the positive and negative pulses, and finally mixing the two sets of regenerated pulses.

Such a system is somewhat delicate since it requires that the two separate regeneration channels give impulses shifted exactly by a bit time, of the same pulse width and shape. Likewise the use of two regeneration channels, in addition to economic considerations, involves the use of a substantial number of components, which may be a considerable problem due to space limitations when such a pulse converter is used as a portion of a line repeater. Converters of this sort are disclosed in U.S. Pat. No. 3,139,615 and 3,149,323 to M. R. Aaron as well as U.S. Pat. No. 3,172,952 to N. E. Lentz. circuitry for converting unipolar code pulses into alternating bipolar code pulses without such regeneration is not disclosed in the prior art,

SUMMARY OF THE INVENTION

In pulse code modulation systems, code signals with alternating bipolar (pseudoternary) pulses are often sent over the transmission line because of well-known advantages which are achieved with respect to those of unipolar pulses. Absence of the DC component in the signal with the resulting possibility of AC couplings of repeaters, as well as concentration of the frequency spectrum within a more reduced bandwidth in respect to the corresponding code unipolar form, are both particular advantages of this mode of transmission.

In converting unipolar pulses into bipolar form it becomes necessary to make use of a memory element which "remembers" the sign of the preceding pulse that has been transmitted to be able to transmit the next pulse with the opposite sign. This memory element is normally a bistable multivibrator or flip-flop. When a flip-flop is employed, conversion can be effected by driving the flip-flop with the unipolar code pulses and differentiating the output signal of the flip-flop. Assuming that flip-flop output signals are obtained with transitions exactly timed with the unipolar code pulses, and with steep leading and trailing edges occurring with zero time delay, alternating bipolar pulses would be obtained exactly timed with the original unipolar pulses. Their form would be, however, nonsuitable for transmission, since they would not be symmetrical with respect to the polar access. Therefore alternating bipolar pulses obtained by differentiation must be regenerated to obtain a form suitable for transmission. As noted previously this regeneration of the alternating bipolar pulses occurs usually by separately regenerating positive and negative pulses and finally mixing the two sets of regenerated pulses.

To convert unipolar code pulses into alternating bipolar pseudoternary code pulses without regenerating them, the present invention employs the reflection occurring in a line matched at the supply terminal and short circuited at the end terminal. More specifically the present circuitry consists of a flip-flop controlled by code pulses in unipolar form, whose output signal is supplied to a short-circuited line of suitable length. This particular circuit arrangement permits code conversion from unipolar into bipolar form without requiring regeneration of the bipolar signal providing the necessary circuit simplification and higher reliability over prior art designs.

DESCRIPTION OF THE PREFERRED EMBODIMENT

Figure 1:
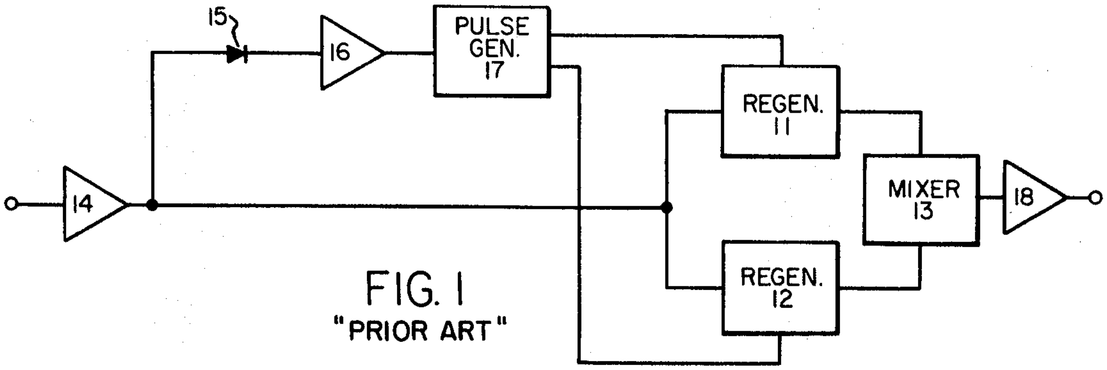
FIG. 1 is a block diagram of a unipolar to bipolar pulse converter according to the prior art.

Referring first to FIG. 1, a prior art bipolar line repeater of the regenerative type is shown for comparative purposes. The circuitry consists of two regenerators 11 and 12, a mixer 13, an equalizer amplifier 14, a rectifier 15, a selective amplifier 16, a short pulse generator 17 and an amplifier 18. Pulse regenerator 11 regenerates positive pulses, while regenerator 12 regenerates negative pulses.

Figure 2:
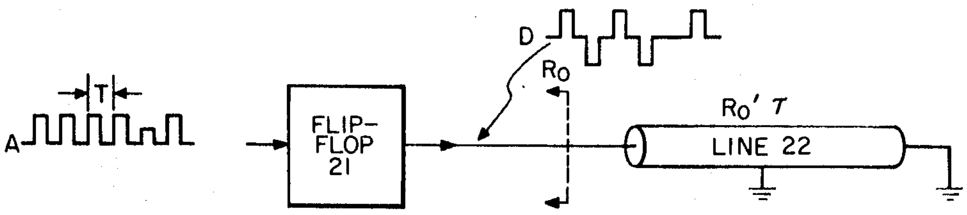
FIG. 2 is a block diagram of a converter according to the present invention.
Figure 4:
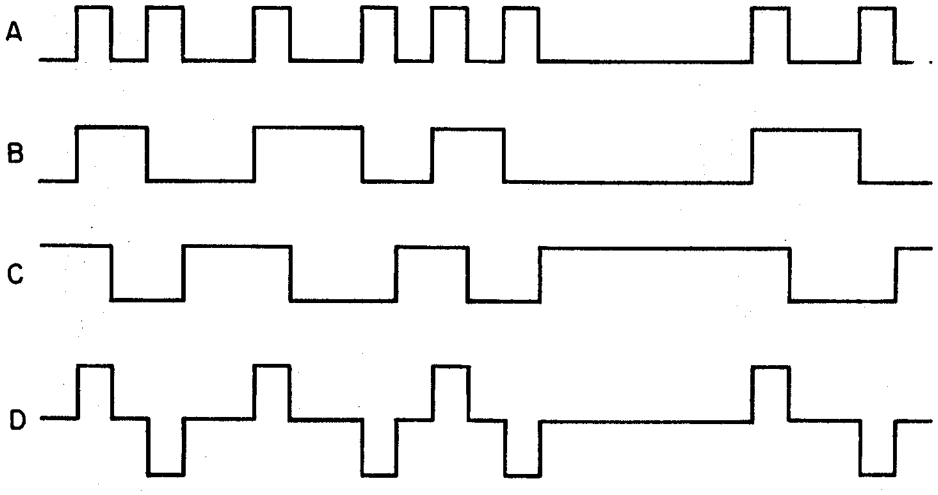
FIG. 4 shows the significant waveforms obtained by means of a converter in accordance with the present invention.

Referring to FIG. 2, a flip-flop 21, is shown connected to a line 22. The unipolar code modulated pulses designated A are applied to the input of flip-flop 21 whose output is shown as the bipolar code modulated pulses designated D, $R_0$ is the characteristic resistance of the line and $\tau$ is the line delay. Referring for a moment to FIG. 4 similar unipolar pulses are shown at A, and similar bipolar pulses are shown at D. At B a waveform representing the direct voltage at the line input is shown, and at C the reverse voltage wave at the line input. It is obvious from examining the waveform D that it is the result of the combination of waveforms B and C, at the line input.

Assuming that the output impedance of flip-flop 21 is the same as the characteristic impedance of the line 22, the propagation time along the line is equal to one-fourth of the repetition period of the unipolar code pulses. Because of the ground connection forming a short circuit at the end terminal of the line 21 a reflection will take place. The reflected signal arrives back at the line input with a T/2 delay and with an opposite sign or polarity with respect to the direct signal applied to the line, whereby resultant signals available at the line input are the sum of the direct signal and reflected signal. This sum signal is coincident with the code signal in bipolar alternating form.

Assuming that the line losses are negligible (which happens in practice, since the lengths involved are usually rather small), the reflected signal will have the same amplitude as the direct signal resulting in positive and negative bipolar code signals of the same amplitude. The width of the pulses may be changed by approximately the value T/2 by changing the line length.

Figure 3:
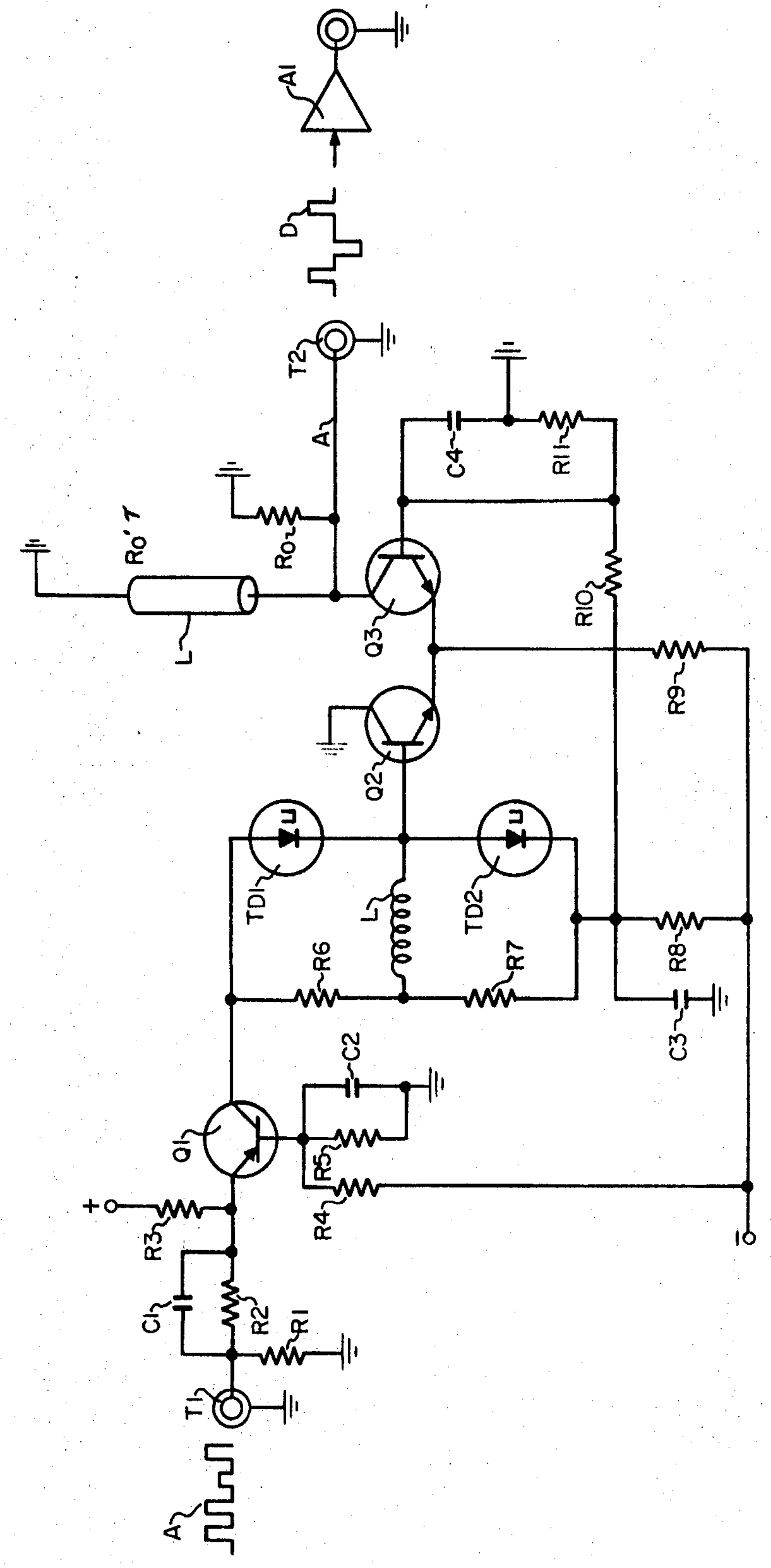
FIG. 3 is a schematic circuit diagram of a converter according to the present invention.

Referring now to FIG. 3, detailed circuitry of a converter in accordance with the present invention is shown. Input pulses are applied at terminal T1 where they are conducted to an amplifier, consisting of transistor Q1 and associated resistors R1 through R5 and capacitors C1, C2.

After amplification pulses are taken from the collector of transistor Q1 and applied to a flip-flop consisting of tunnel diodes TD1 and TD2, inductance L and resistances R6 and R7. As each incoming pulse is conducted from transistor Q1 to the flip-flop, its output between tunnel diodes TD1 and TD2 acts to alternately turn transistor Q2, on and off. Transistor Q2 acts as an emitter follower, the output of which is applied to the emitter of transistor Q3. Transistor Q3 operates as a common base amplifier with its collector connected to terminal T2 as well as to terminating resistance Ro and line $R_0'\tau$. When transistor Q2 is conductive, transistor Q3 will be turned off. When transistor Q2 is turned off transistor Q3 will be turned on. Biasing for transistors Q2 and Q3 is provided by resistances R8 through R11.

Output pulses taken from the collector of transistor Q3 are like those shown in waveform B of FIG. 4. When these pulses are applied to the short circuited line L a reflected signal will be returned (from the line) whose waveform corresponds with that shown at C in FIG. 4. The resultant combination of these two waveforms at terminal T2 is like that shown at D in FIG. 4. Additional amplification of the resultant bipolar waveform may be supplied by amplifier A1.

It is essential in the present invention to provide a flip-flop whose transitions from one state to the other are sufficiently short with respect to the times involved and occur with the same delay with respect to the unipolar code control pulses. To achieve this end a tunnel diode flip-flop is employed.

The tunnel diode flip-flop provides a square wave with very steep edges occurring exactly at the code repetition rates, but with insufficient flat tops to the waveform. To assure a square wave of suitable form, i.e., with steep edges and flat tops, it is advisable to interpose a slicer, between the flip-flop and the reflective line, which picks up only the middle portion of the square wave provided by the flip-flop. The slicer circuitry consists of transistors Q2 and Q3 and the associated bias circuitry. The bias is so chosen as to permit the collector load of transistor Q2 to be connected directly to ground. In the collector circuit of transistor Q3 the line (which is short circuited at the end terminal and matched at the energization terminal) is included.

As noted before, at the output terminal T2, the code signal in bipolar form is available with a peak to peak amplitude $R_0I$, where $R_o$ is the characteristic resistance of the line and I is the emitter current of the current routing circuit.

Amplifier $A_1$ has a high input impedance and AC coupling, and is employed to raise the bipolar alternating signal level to the desired amplitude.

While but one embodiment of the invention has been described it is obvious that many changes and modifications can be made without departing from the scope of the invention.

What is claimed is:

1. A circuit for converting unipolar code pulses into corresponding bipolar code pulses, comprising: an amplifier including an input for connection to a unipolar pulse source; a bistable flip-flop including an input connected to said amplifier, operated in response to amplified unipolar code pulses to produce a corresponding train of bilevel pulses; a slicing circuit connected to the output of said flip-flop, operated to shape said bilevel pulses received from said flip-flop, operated to shape said bilevel pulses received from said flip-flop; a delay line of predetermined length connected at the near end to the output of said slicing circuit and short circuited at the distant end; whereby shaped bilevel pulses from said slicing circuit are conducted to said line; and output circuit means also connected to the output of said slicing circuit and to the near end of said line; said bilevel pulses being reflected pulses with reversed polarity and a predetermined time delay by said line; said pulses conducted to said line and said reflected pulses resulting in signals at said output circuit corresponding to said unipolar input pulses, in bipolar alternating code signal form.

2. A converter circuit as claimed in claim 1 wherein: said shaping circuit output impedance is matched to the characteristic impedance of said line.

UNITED STATES PATENT OFFICE
CERTIFICATE OF CORRECTION

Patent No. 3,609,755 Dated September 28, 1971

Inventor(s) ALESSANDRO FENYVES

It is certified that error appears in the above-identified patent and that said Letters Patent are hereby corrected as shown below:

Column 4, lines 11 and 12 delete-- ,operated to shape said bilevel pulses received from said flip-flop -- line 18 delete -- pulses (second occurrence) --

Signed and sealed this 19th day of December 1972.

(SEAL)
Attest:

EDWARD M.FLETCHER,JR.
Attesting Officer

ROBERT GOTTSCHALK
Commissioner of Patents